United States Patent [19]

Robins

[11] Patent Number: 4,657,171

[45] Date of Patent: Apr. 14, 1987

[54] REPAIR OF A MEMBER HAVING A PROJECTION

[75] Inventor: Bertrand G. Robins, Marysville, Wash.

[73] Assignee: General Electric Company, Cincinnati, Ohio

[21] Appl. No.: 744,365

[22] Filed: Jun. 13, 1985

[51] Int. Cl.⁴ .............................................. B23K 31/00
[52] U.S. Cl. .................................... 228/119; 228/170; 228/231; 228/263.13; 228/263.16; 29/402.06; 29/402.09
[58] Field of Search ........... 228/119, 170, 231, 263.13, 228/263.14, 263.15, 263.16; 29/402.02, 402.06, 402.07

[56] References Cited

U.S. PATENT DOCUMENTS 3,846,899 11/1974 Gross ................................ 29/402.02
4,159,410 6/1979 Cooper ............................ 219/137.7
4,441,012 4/1984 Risbeck et al. ................. 219/137 R

FOREIGN PATENT DOCUMENTS 286089 3/1928 United Kingdom ................ 228/119

Primary Examiner—Nicholas P. Godici
Assistant Examiner—Karen Skillman
Attorney, Agent, or Firm—Lee H. Sachs; Derek P. Lawrence

[57] ABSTRACT

Repair or replacement of a projection such as a labyrinth seal tooth of a metal having relatively poor weldability characteristics is accomplished by removing a portion or possibly all of the seal tooth down to a pedestal and then metallurgically bonding as by fusing to the pedestal a second metal characterized as having good weldability characteristics when diluted with the first metal, and age hardenable with an aging heat treatment with which the first metal also is age hardenable.

7 Claims, 4 Drawing Figures

REPAIR OF A MEMBER HAVING A PROJECTION

This invention relates to the repair of a metal member which includes a projection and, more particularly, to the repair of such a member as a seal made of a material having relatively poor weldability and repair weldability characteristics.

BACKGROUND OF THE INVENTION

A variety of stationary and rotating seals, generally referred to as of the labyrinth type, are used in various parts of a gas turbine engine. During manufacture, operation, maintenance, etc, such seals, which include one or more projections or teeth connected with a support structure, can be worn or damaged.

It has become common practice to repair in a relatively cost effective manner certain types of such seal teeth or projections by first removing the damaged portion of the tooth. The same material of the tooth then is reapplied as by welding with a filler wire, with excess added material being removed, such as by machining, to regenerate the tooth. Methods and apparatus for conducting such repair is described in U.S. Pat. No. 4,159,410—Cooper, issued June 26, 1979, and U.S. Pat. No. 4,441,012—Risbeck and Cooper, issued Apr. 3, 1984, the disclosures of which are hereby incorporated herein by reference. As is described in these patents, a filler material in wire form is moved in a reciprocating manner into and out of a weld pool created by a heating source such as an electric arc.

In some cases, because of poor weldability, including poor weld flow characteristics and crack sensitivity of the metal from which the projection or tooth is made, the seal teeth cannot be repaired in a practical manner. Accordingly, when damaged, the costly member may be reshaped for use in another engine position or replaced, rather than repaired.

SUMMARY OF THE INVENTION

It is a principal object of the present invention to provide an improved method for repairing a member having a projection, at least the projection having been made of a metal having relatively poor weldability and repair weldability characteristics.

It is another object of the present invention to provide a method for repairing such a member in the form of a seal having at least one tooth.

A further object of the present invention is to provide a seal member which includes a composite projection or seal tooth.

These and other objects and advantages will be more fully understood from the following detailed description, the examples and the drawings, which are all intended to be typical of rather than in any way limiting on the scope of the present invention.

Briefly, one form of the method of the present invention involves repairing a metal article comprising a support and a projection of an operating height and shape projecting from a surface of the support. The projection, and generally the support, is made of a first metal characterized as having relatively poor weldability and repair weldability characteristics. Generally the method includes removing at least a portion of the projection and replacing the removed portion with additional material.

In the improved method, at least a portion of the operating height of the projection is removed, usually providing a projection pedestal. There is provided, preferably in wire form for use in a welding type operation, an additional material of a second metal characterized as having good weldability and repair weldability characteristics when diluted with the first metal and age-hardenable with an aging heat treatment with which the first metal is also age hardenable. The second metal is metallurgically bonded as additional material, for example as by melting and fusing molten material with the support or the projection pedestal, or both. When bonded, as by being solidifed and cooled, the additional material is in the condition substantially of a solid solution. This provides a repair support/projection preform. The preform is then subjected to the aging heat treatment after which a portion of the additional material is removed to regenerate the projection in its operating height and shape.

Another form of the invention provides a rotary labyrinth seal having a support and at least one integral seal tooth as a projection. The projection is a composite of the above-described first metal, preferably, as a tooth pedestal, metallurgically bonded with the above-described second metal.

DESCRIPTION OF THE PREFERRED EMBODIMENT

The modern gas turbine engine, for example the type used in aircraft, includes a variety of seals some of which are labyrinth-type rotary seals. Examples of such seals are shown in the description of U.S. Pat. No. 4,397,471—Feldman et al, issued Apr. 9, 1983, and assigned to the assignee of the present invention. The disclosure of such patent is hereby incorporated herein by reference. In such seals, at least one tooth or projection, and generally a plurality of teeth or projections, cooperates with an opposed surface which can be continuous or can be a porous or open-celled structure such as honeycomb. In some cases, the tooth projections rotate with rotating engine components; in other cases, the opposed surface, such as a shaft, rotates in respect to stationary toothed members. Because various components of a gas turbine engine associated with the cooperating seal members tend to expand at different rates during operation, an interference can occur with, and damage can result in, the tooth or projection. In other instances, the tooth or projection can be eroded by airborne particles impinging on the tooth. In still other instances, teeth can be damaged during manufacture, assembly, or maintenance of the seal or engine. In any event, frequently it is necessary to repair such teeth or projections.

One method for making such repair is described in the above-incorporated U.S. Pat. No. 4,159,410—Cooper. In that method, the damaged portion of the tooth is removed and a filler wire is fed into a weld pool created on the tooth by a heating source such as a welding torch. In this way, generally through multiple passes over the tooth, additional material is metallurgically bonded to the tooth to an appropriate height. Then the material is removed such as by machining to regenerate the tooth.

Attempts have been made to apply this type of method to gas turbine engine seal teeth made of a metal known to have poor weldability and repair weldability characteristics, for example an iron-base alloy, one form of which is commercially available as A286 Alloy, and having a nominal composition, by weight, of about 15% Cr, 25% Ni, 1.3% Mo, 2.2% Ti, 0.006% B, 0.3% V with the balance Fe. As is well known in the art, such alloy is a challenging material to weld, due in part to its poor flowing characteristics in the molten state and the propensity for cracking, particularly in the heat-affected zone. These characteristics, called poor weldability characteristics, severely reduce the weldability of this material by the method described in the Cooper patent. For example, initial melt-down passes, generally made as an early step in the process, are inconsistent and of very poor quality. This condition presents great difficulty for deposition of subsequent weld layers, and is considered to have poor repair weldability characteristics.

Figure 1:
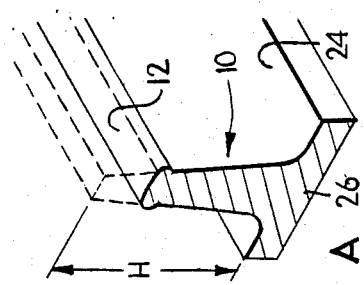
FIG. 1 is a diagrammatic sequence of steps utilizing a currently practiced method for repairing labyrinth seal teeth on a seal of a metal alloy commercially available as IN718 Alloy and characterized as having relatively good weldability characteristics.
Figure 1:
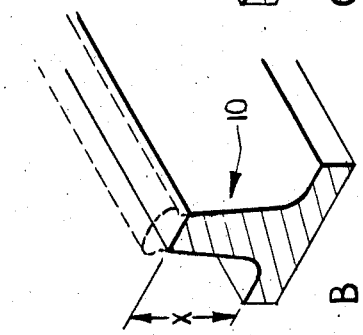
Figure 1:
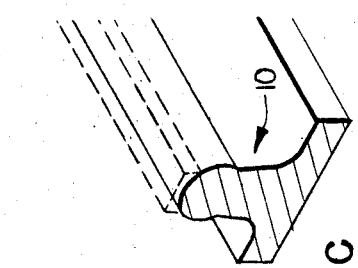
Figure 1:
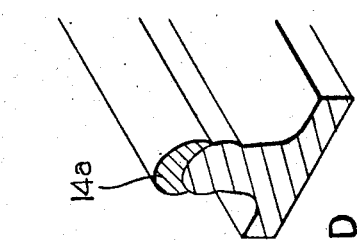
Figure 1:
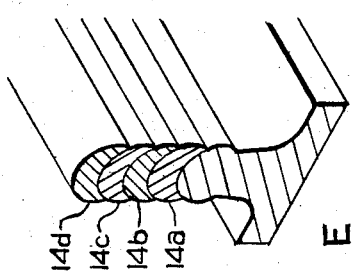
Figure 1:
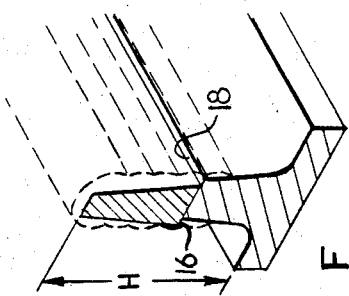

The above described sequence of steps using the known method is shown in the diagrammatic, fragmentary, perspective sequential views of FIG. 1. FIG. 1A is a transverse cross-sectional view of the as-received seal tooth 10, representative of a projection, showing the worn or damaged tip portion at 12. The operating height of the tooth, i.e. the height to which the tooth originally was manufactured, is shown at H, with the original configuration of the tooth shown in phantom. FIG. 1B is a transverse cross-sectional view of such seal tooth 10 after removal of tip portion 12. The removed portion is shown in phantom. Sometimes such a step is referred to as pre-weld machining.

If the seal tooth 10 is made of a material characterized as having relatively good weldability and repair weldability, one example of which is commercially available IN718 Alloy which has a nominal composition, by weight, of about 0.05% C, 19% Cr, 18% Fe, 3% Mo, 5% Cb and Ta, 1%, 0.5% Al, with the balance Ni, the remainder of the sequence of steps in FIG. 1 can be conducted without significant difficulty. IN718 Alloy is well known in the art to have good weldability and repair weldability characteristics.

FIG. 1C is a transverse cross-section of tooth 10 after a melt-down (autogenous) pass. In this step, heat is applied to the machined surface portion of the tooth, shown in phantom, with no filler material added, and generally at constant magnitude of current, to melt the tooth outer portion and prepare that portion for subsequent operations. FIG. 1D is a transverse cross-section showing additional IN718 Alloy filler wire material 14a added using the above-described Cooper method. Similarly, FIG. 1E shows subsequently added material 14b, 14c, and 14d to a specified height, greater than height H, from which a regenerated tooth can be machined. FIG. 1F shows the final machined tooth with a portion of the added filler material, shown in phantom, machined away. It should be noted that either a positive step portion 16 or a negative step portion 18 (both of which are shown for convenience and of exaggerated size in the presentation in FIG. 1F) generally remains as a result of inherent mismatch in set-up for machining. Such a step portion generally is located at metallurgical bond or weld junction zone at the intersection of the machined weld metal to the existing tooth portion, and is of a size allowable with the use of IN718 Alloy.

Application of such a repair method to an alloy such as A286 Alloy which has poor weldability, including crack sensitivity characteristics has not been found to be successful. For example, the poor weldability and susceptibility to cracking does not permit an adequate melt-down step of the type described in connection with FIG. 1C.

Figure 2:
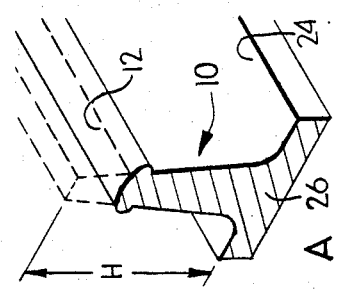
FIG. 2 is a diagrammatic sequence of steps attempting to utilize a currently practiced method for repairing labyrinth seal teeth on a seal of a metal alloy commercially available as A286 Alloy and characterized as having relatively poor weldability characteristics.
Figure 2:
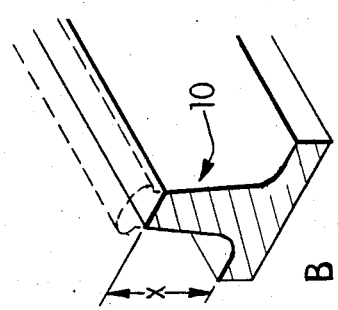
Figure 2:
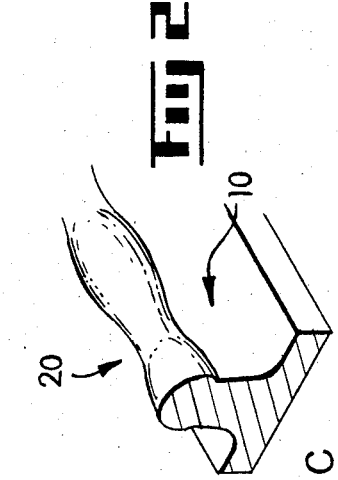

FIG. 2 is a diagrammatic, fragmentary, perspective sequence of views showing an attempt to use the known method, described in the sequence of views of FIG. 1, with an A286 Alloy seal tooth. In this example, the seal of FIG. 2A was prepared in the form shown in FIG. 2B, as described above in connection with FIGS. 1A and 1B. However, when an attempt was made at the autogenous melt-down pass to prepare the outer tooth portion for subsequent operations, an unacceptable condition resulted. As shown in FIG. 2C, the melted portion was irregular in thickness and shape, as shown generally at 20, with unacceptable bulges and thinned portions as a result of the poor weldability characteristics of the A286 Alloy. Further repair operations, such as the type described in connection with FIG. 1, are extremely difficult and unacceptable in a production situation.

Figure 3:
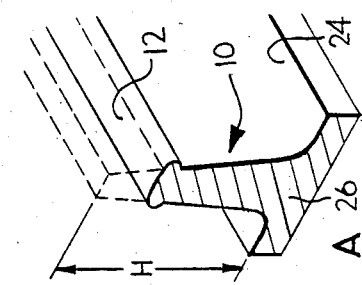
FIG. 3 is a diagrammatic sequence of steps utilizing the present invention for repairing labyrinth seal teeth of the difficult to weld A286 Alloy.
Figure 3:
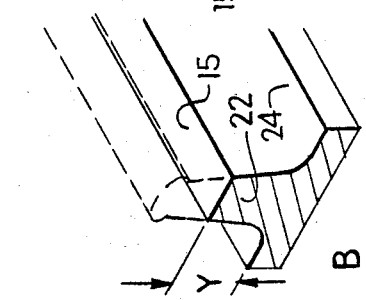
Figure 3:
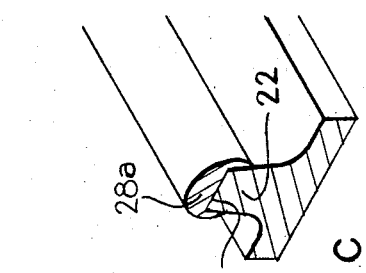
Figure 3:
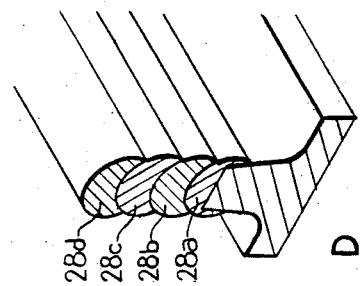
Figure 3:
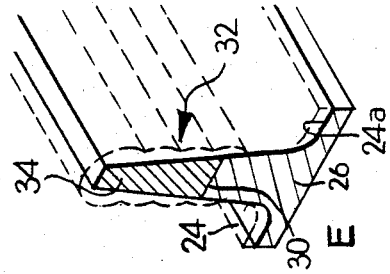

The method of the present invention eliminates the autogenous melt-down procedure and avoids generation of step portions 16 or 18 in FIG. 1F, providing a replacement tooth of a material more easily repaired in subsequent repair procedures. The present invention, in one form, is summarized in the diagrammatic, fragmentary, perspective sequential views of FIG. 3, which are all transverse cross-sections. FIG. 3A, like FIG. 1A, shows the seal tooth 10 in the as-received condition with worn or damaged portion at the tip shown at 12. FIG. 3B shows the removal of at least a portion of the operating height H of the tooth or projection 10. According to the present invention there is provided, in this way, a base location 15 for subsequent operations. Generally, a projection pedestal 22 in FIG. 3B remains, although it should be understood that all of tooth 10 can be removed (for example, flush with surface 24) and replaced with additional material metallurgically bonded to such base location. Generally, the projection pedestal extends in a range up to about 0.1" away from first surface 24 of support 26. In comparison with the sequence of FIG. 1, such removal generally is very much greater than in the known method, to result in a base location or projection pedestal of up to about 0.1" away from surface 24. For example, in one production part made of A286 Alloy, the operating height of tooth or projection 10 in FIG. 3A above surface 24 of support 26 was about 0.13". Tooth 10 had a cross-sectional thickness of 0.01" joined to surface 24 at a radius of about 0.05". In the known repair, dimension X in FIG. 1B was 0.12" whereas dimension Y in FIG. 3B was no greater than about 0.10". In one form of the present invention for use with relatively large seal teeth, removal of such major portion of the tooth of the relative dimensions described avoids the requirement for a melt-down operating in a difficult to weld material like A286 Alloy.

According to the present invention, after pre-weld machining, the melt-down operation is eliminated and a filler, additional, material is added to base location 15 and projection pedestal 22 as shown at 28a in FIG. 3C. Through an appropriate number of additional sequential steps represented by FIG. 3D, sufficient additional material is metallurgically bonded to a height sufficient to enable regeneration, for example through machining, of a replacement tooth to its operating height H. In FIG. 3D, the multiple passes of added filler material are represented by the portions 28a, 28b, 28c, and 28d. In this way, the repair support/projection preform shown in FIG. 3D is provided. The additional material added as 28a, 28b, 28c, and 28d is of a metal characterized as having good weldability and repair weldability characteristics when diluted with the metal of the member being repaired, in this example A286 Alloy. Further, the additional material is characterized as being age-hardenable with a post-weld aging heat treatment with which the metal of construction, for example A286 Alloy, also is age-hardenable. In this particular example, such additional material which is compatible and useful in the method of the present invention in the repair of A286 Alloy seal teeth is the above identified, commercially available IN718 Alloy. Such alloy, when metallurgically bonded as by welding to the A286 Alloy, is in a condition which is substantially a solid solution at the bond juncture zone. It should be recognized that when the additional material is applied by welding to the material of construction of the seal member, a portion of the material of construction will melt and dilute the additional material being applied.

After provision of the repair preform, for example of the type shown in FIG. 3D, a portion of the additional material is removed, as shown in FIG. 3F, from about projection pedestal 22 and, optionally, from the surface 24 of support 26 to regenerate the composite projection without a step portion of the types shown at 16 or 18 in FIG. 1F. The metallurgical bond or weld junction zone 30 in FIG. 3E away from the fillet between projection pedestal 22 and support 26 at which higher stresses generally are experienced during operation. To avoid generation of step portions 16 or 18 of FIG. 1F, a portion of surface 24 of support 26 can be machined away along with excess additional material, shown in phantom in FIG. 3E, to regenerate the tooth and to provide a new support surface 24a in FIG. 3E. The regenerated composite projection shown generally at 32 in FIG. 3F has an outer portion 34 away from support 26 and is of a metal characterized as having good weldability and repair weldability characteristics. The projection can be repaired subsequently, if the need should arise, according to a method used prior to the present invention, for example as described in connection with the sequence of views in FIG. 1.

In a typical example of practice of the present invention, a gas turbine engine seal made of A286 Alloy and having damaged labyrinth seal teeth was prepared for repair by cleaning in a sodium hydroxide aqueous solution after which it was rinsed in water and dried with air. Thereafter, it was inspected using the fluorescent penetrant inspection technique commonly used in the art to determine if any cracks existed in the article. Principal dimensions of the article were as follows: 11.9" diameter seal teeth having a nominal thickness of 0.01" and an 11.7" diameter pedestal with 0.045" typical radius between the seal teeth and the pedestal. Seals found to be unserviceable yet repairable were then mounted in a lathe and machined to remove a portion of the seal tooth or projection as shown in FIG. 3B. After pre-weld machining, there remained a pedestal such as 22 in FIG. 3B having a height Y of no greater than about 0.1". After machining, the pedestal and adjacent surfaces were cleaned and the seal held on a rotating work table for application of additional material in accordance with the above-described Cooper method.

Specific welding parameters used in the present invention are unique to each article configuration. They are selected, by a manner well-known in the welding art, to minimize heat input and depth of penetration, to accomodate the poor weldability characteristics of A286 Alloy, and to induce a minimal amount of distortion into the seal. As has been stated, in general, A286 Alloy exhibits poor weldability and repair weldability. The base metal at the toe of the weld (the intersection of the surfaces of the base metal and weld metal) is very susceptible to cracking, a condition around which the welding parameters were developed. Since most cracks generally are open to the surface of the base metal, such cracks are easily detectable using fluorescent penetrant inspection. According to the present invention, welds have been produced which are entirely free from this characteristic cracking problem of A286 Alloy.

In this example, the additional material or filler material used and which has good weldability and repair weldability characteristics as well as being age-hardenable with a post-weld aging heat treatment with which the A286 Alloy is age-hardenable was the above-described, commercially available IN718 Alloy, also identified as AMS5832 Alloy. As has been stated, it was selected because when diluted with A286 Alloy, the IN718 Alloy exhibits good weldability characteristics, thus facilitating the welding process. Also, both A286 and IN718 Alloys respond favorably to the same aging post-weld heat treatment. This allows for the restoration of mechanical properties after welding without subjecting the seal to a full solution heat treatment. In addition, IN718 Alloy as a replacement seal tooth is very weldable and can later be re-repaired by welding by more conventional welding techniques such as that described in the above-incorporated Cooper patent.

In this example, the additional IN718 Alloy material was applied in the range of 3-10 pass increments of approximately 0.03" thick each to generate on the seal support a repair support/projection preform represented by FIG. 3D. The preform was then heat treated by a vacuum heat treatment cycle which had been developed for A286 gas turbine engine blades which had been repaired with IN718 welded tips. The treatment consisted of evacuating the chamber to about 0.5 microns Hg or less, after which the part was heated to about 1400° F. for about two hours. Thereafter, the part was cooled to about 1150° F. at a cooling rate of about 100° F. per hour and then held at 1150° F. for about four hours after which it was cooled by back-filling the chamber with an inert gas.

Figure 4:
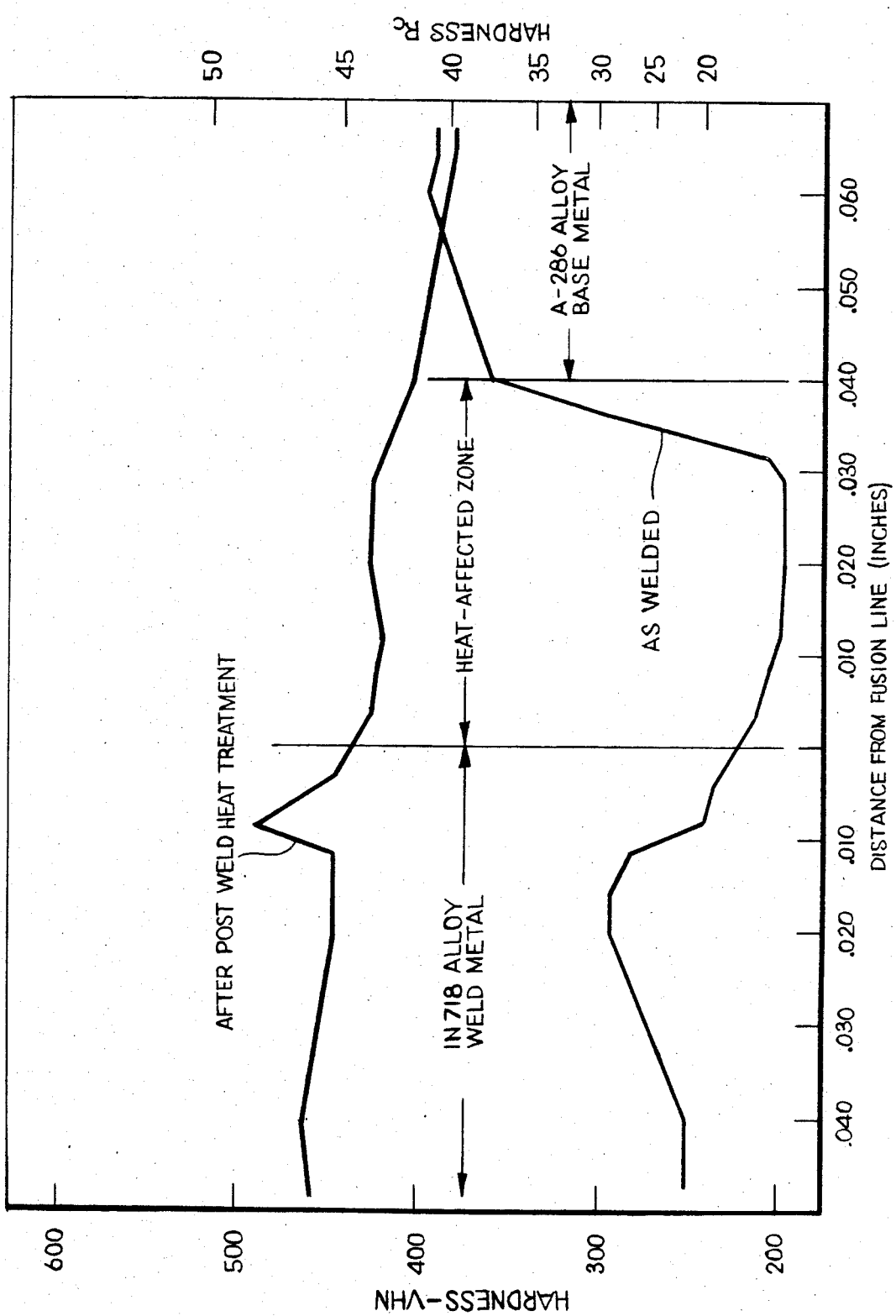
FIG. 4 is a graphical presentation of a microhardness traverse across a seal tooth repaired according to the method of the present invention and in the as-welded and in the post-weld heat treated conditions.

Use of this type of aging heat treatment rather than a solution and aging heat treatment is facilitated by the use of the type of method described in the above-incorporated Cooper patent. Through the use of such method, the deposited weld metal, metallurgically bonded to the substrate material, is essentially in the solution condition upon solidification and cooling. The degree of auto-aging which occurs as weld increments (passes) are stacked one upon the other, as shown in FIG. 3D, is negligible due to the short times that the metal is at the aging temperatures. The heat-affected zone consists of that portion of the base metal which was metallurgically altered due to the welding heat. The dominant region of the heat-affected zone is that portion which was put into the solution condition. This solution region responds to the short age heat treatment described above similarly by both the IN718 Alloy and the A286 Alloy base metal. FIG. 4 is a graphical presentation of a microhardness traverse in both the as-welded and after post-weld heat treatment conditions. In FIG. 4 in connection with hardness data, "$R_C$" means "Rockwell C", and "VHN" means "Vickers Hardness Number".

After heat treatment, the preform was machined to regenerate the seal teeth or projections to their operating height and shape. In this example, a portion of the additional material shown in FIG. 3D was removed, as shown in phantom in FIG. 3E. In addition, a small amount of surface 24 of support 26 was removed to eliminate all deposited additional material at the fillet of the seal tooth and to move the fusion line 30 in FIG. 3E away from the base of the radius between the seal tooth and support 26.

After machining, the article was inspected for distortion. It was found that the practice of the method of the present invention produced a minimal distortion which was within the serviceable limits of the part.

Although the present invention has been described in connection with specific examples, alloys, and embodiments, such as seals, it will be recognized by those skilled in the art the variations and modifications of which the present invention is capable without departing from its scope represented by the appended claims.

What is claimed is:

1. In a method of repairing a metal article comprising a support and a projection of an operating height and shape projecting from a first surface of the support, the projection being of a first metal characterized as having relatively poor weldability and repair weldability characteristics, including poor weld flow and crack sensitivity, the method including removing at least a portion of the projection and replacing the removed portion with additional material, the steps of:
   mechanically removing at least a portion of the operating height of the projection to provide a projection pedestal having a base location extending in a range up to about 0.1" away from the first surface;
   providing an additional material of a second metal characterized as having good weldability and repair weldability characteristics when diluted with the first metal and age hardenable with an aging heat treatment with which the first metal also is age hardenable;
   metallurgically bonding the additional material directly to the base location, without prior melting of the base location, at a bond juncture zone to replace at least the removed portion, the additional material after bonding being in a condition which is substantially a solid solution, to provide a repair support/projection preform;
   subjecting the preform to the aging heat treatment; and then
   removing a portion of the additional material to regenerate the projection in the operating height and shape.

2. The method of claim 1 in which the projection is a seal tooth.

3. The method of claim 2 in which the first metal is A286 Alloy, and the second metal is IN718 Alloy.

4. The method of claim 1 in which a portion of the first surface is removed adjacent to the projection pedestal, along with additional material, to position the bond juncture zone more remote from the support.

5. The method of claim 1 of repairing a metal article in which the projection is integral with and projecting from the support at a fillet with the first surface, the projection, and the support being of the first metal wherein:
   a major portion of the projection is removed to provide the projection pedestal;
   the additional material is provided in wire form; and
   the additional material is deposited by melting the wire and fusing the molten wire material with the base location and projection pedestal to provide the repair support/projection preform.

6. A labyrinth gas seal comprising a support and at least one seal tooth projecting from a surface of the support wherein:
   the tooth is a composite of a first metal in the form of a tooth pedestal integral with and projecting in a range of up to about 0.1" from a surface of the support and a second metal metallurgically bonded at a bond juncture zone directly to the tooth pedestal which exhibits no prior melting of the tooth pedestal at the bond juncture zone;
   the first metal is characterized as having relatively poor weldability and repair weldability characteristics and the second metal is characterized as having good weldability and repair weldability characteristics when diluted with the first metal and age hardenable with an aging heat treatment with which the first metal also is age hardenable.

7. The seal of claim 6 in which the first metal is A286 Alloy, and the second metal is IN718 Alloy.

* * * * *